No. 645,133. Patented Mar. 13, 1900.
A. F. ROCKWELL.
BACK PEDALING BRAKE.
(Application filed July 22, 1898.)
(No Model.)
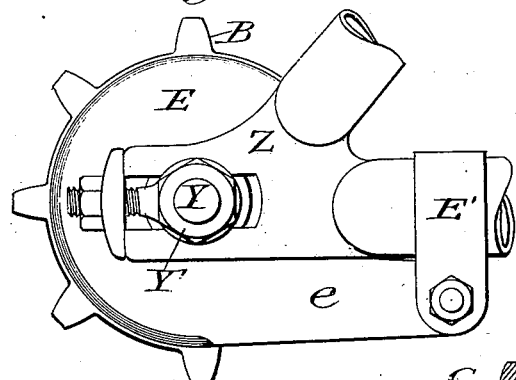
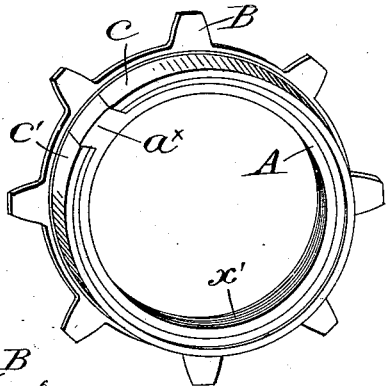
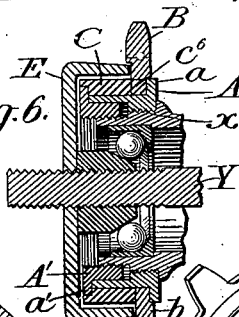
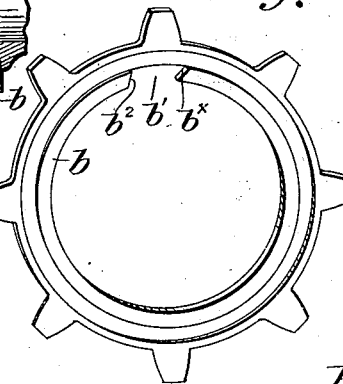
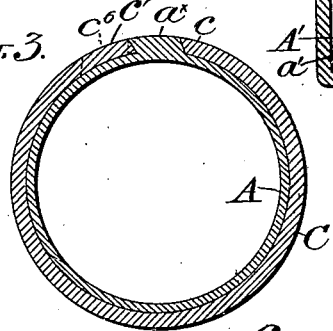
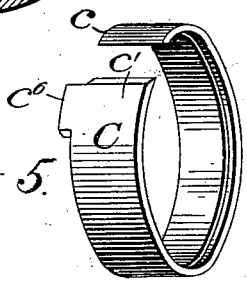
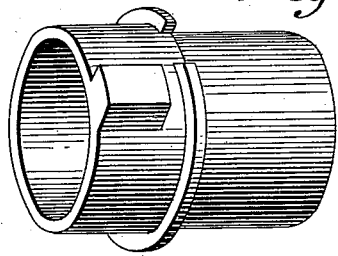
Witnesses:
Laura B. Penfield.
Alice E. Brown
Inventor.
Albert Fenimore Rockwell
By Newell & Jennings
His Attorneys.
THE NORRIS PETERS CO., PHOTO-LITHO., WASHINGTON, D. C.

UNITED STATES PATENT OFFICE.

ALBERT FENIMORE ROCKWELL, OF BRISTOL, CONNECTICUT, ASSIGNOR TO THE NEW DEPARTURE BELL COMPANY, OF SAME PLACE.

BACK-PEDALING BRAKE.

SPECIFICATION forming part of Letters Patent No. 645,133, dated March 13, 1900.

Application filed July 22, 1898. Serial No. 686,587. (No model.)

*To all whom it may concern:*

Be it known that I, ALBERT FENIMORE ROCKWELL, of Bristol, in the county of Hartford and State of Connecticut, have invented certain new and useful Improvements in Bicycle-Brakes; and I do hereby declare the following to be a full, clear, and exact description of the invention, such as will enable others skilled in the art to which it appertains to make and use the same.

My invention relates to improvements in back-pedaling brakes of the class shown and described in the patent to George E. Whitney, No. 527,571, dated October 16, 1894.

The object of my invention is to provide such a construction of the parts as that the movable brake member, which in this instance takes the character of a split expansible ring, may be caused to expand against the braking-surface in such a way as to be in contact therewith at substantially all points.

Reference is to be had to the accompanying drawings and to the letters marked thereon, the same letters designating the same parts and features wherever they occur.

Of the drawings, Figure 1 represents the brake attached to the rear hub of a bicycle. Fig. 2 is a view in perspective of the sleeve and the expansible brake-ring and sprocket applied thereto. Fig. 3 is a sectional view of the sleeve and the brake-ring applied thereto. Fig. 4 is a perspective view of the sprocket. Fig. 5 is a perspective view of the expansible brake-ring. Fig. 6 is a central sectional view of the brake parts, hub, and axle. Fig. 7 is a perspective view of a part of the hub of a wheel with flange and lug, to be referred to hereinafter.

In this illustration of my invention a bushing or sleeve A is screwed onto the hub by means of the screw-threads $x'$, which forms a seat or bed for the other elements entering into the construction of my improved brake. This bushing is provided with a lug or projection $a^x$ and a flange $a$. The lug is cut away, so as to leave a space between it and the flange. A sprocket-wheel B is mounted upon the hub or sleeve loosely, so that it may have a rotation upon the hub or sleeve between the aforesaid flange $a$ and lug upon the hub or sleeve. The sprocket-wheel is provided with an aperture $b'$ in its web, which permits it to be slipped over the lug upon the sleeve or hub and also serves to connect it with the brake-ring, as hereinafter described.

C is the split expansible brake-ring provided with a means of connection with the sprocket-wheel, which in this instance is illustrated as a projection $c^6$ upon the end $c'$ thereof, which when the brake-spring is mounted upon the hub or sleeve enters into the aperture $b'$ in the web of the sprocket-wheel B. The forward end of the lug $a^x$ upon the hub or sleeve is cut away obliquely or beveled, and in a corresponding manner the end of the brake-ring $c$ is cut away obliquely or beveled, so that it fits against the aforesaid side of the lug, so that the respective edges form two complementary inclined faces. In this illustration the brake-ring is shown as having a rim projecting slightly beyond the edge of the sleeve or hub, so that when the sleeve or bushing A has been screwed upon the hub a set-nut A', having a complementary flange, may be screwed upon the hub, and thus hold the brake-ring firmly in position thereupon. This, however, is a detail of manufacture and may be used or not, according to the convenience or facilities of the maker. It is desirable to make the aperture $b'$ in the web of the sprocket-wheel B a little larger than the projection $c^6$ on the brake-ring C, so that there may be a certain amount of play of said projection within said aperture. The bushing, with the sprocket and brake-ring applied, is then screwed onto the hub, the set-nut is applied with the opposite threaded screw to lock the whole in position, and a brake-drum E is mounted thereupon, its inner surface being provided, if desired, with a coating of leather or fiber to furnish an effective braking-surface. The brake-drum is of course provided with an orifice to fit over or screw upon the axle Y of the bicycle, and it is provided with an arm $e$, which in turn is provided with a strap E' to surround the fork and securely fasten the brake-drum E against turning.

The operation of this embodiment of my invention as herein illustrated is as follows:

The sprocket is of course connected with the sprocket on the crank-axle of the bicycle by the usual chain. Upon pedaling forward the sprocket is forced to rotate in a forward direction, and being connected with the brake-ring through the projection $c^6$ in engagement with the aperture $b'$ the brake-ring is compelled also to revolve in a forward direction, and as its end $c'$ butts against the lug $a^\times$ the bushing, and consequently the hub, will also be propelled in a forward direction and the bicycle be operated in the usual manner. The plane of engagement between the forward end of the brake-ring and the rear end of the lug may be in the plane of the radius of the hub and connected parts, or, if preferred, the lug may be slightly cut under, as shown, the end of the brake-ring being correspondingly beveled, so that the complementary planes of the respective edges may be slightly oblique to the plane of the radius of the rotating parts. Upon the other hand, when the rider desires to retard the progress of his wheel he performs the operation of back-pedaling, which tends to check the forward rotation of the sprocket-wheel and correspondingly the forward rotation of the brake-ring thereupon. The tendency of the hub and bushing thereupon is, however, to still rotate in a forward direction. We therefore have this condition of things: The hub and bushing tend to rotate in a forward direction. The sprocket and brake-ring connected therewith tend to rotate in a backward direction and to force the other end of the brake-ring $c$ against the forward end of the lug $a^\times$. As heretofore stated, the plane of the edges of the lug and the brake-ring as they come in contact is oblique—that is to say, the surfaces of the two edges form complementary inclined planes—and when the edge of the brake-ring is forced against the edge of the lug in the first instance the end of the brake-ring will be caused to slide up or advance upon the lug so far as it is permitted to do so by the brake-drum which surrounds it, the backward pressure being continually exerted so as to expand the brake-ring until the whole surface thereof is forced into contact with the inner circumference of the brake-drum.

It will be observed that I have illustrated the edges of the aperture in the web and the corresponding edges of the projection $c^6$, which come in contact therewith, as inclined planes corresponding with but in an opposite direction to the planes of the edges of the lug $a^\times$ and the corresponding contactual edges of the brake-ring—that is, when the sprocket-wheel is forced backward the edge $b^\times$ will engage firmly with the forward edge of the projection $c^6$ and force it backward, but the plane being slightly inclined will permit the forward edge of the projection to slide up or advance upon the edge $b^\times$, and thus allow the end $c'$ of the brake-ring to come in contact with the surface of the brake-drum. In a similar manner in forcing the sprocket forward the edge $b^2$ of the sprocket will tend to advance upon the complementary inclined face of the rear edge of the projection $c^6$, and thus force the end $c'$ downward into close contact with the rear edge of the lug $a^\times$.

I would have it understood that certain changes may be made in the details of construction without departing from the spirit of my invention. For example, when the brake is manufactured and applied by a bicycle manufacturer the hub may be constructed with a lug having an inclined edge directly thereupon, thus avoiding the necessity of a separate sleeve or bushing, as illustrated in Fig. 7. The sleeve or bushing is necessary where the brake is made as a separate article of manufacture to be applied to wheels.

Having described my invention, what I claim as new, and desire to secure by Letters Patent, is—

1. In combination with the driving-wheel of a bicycle provided with a suitable hub, a sleeve or bushing applied to the sprocket end of said hub, said sleeve having an inclined part for engagement therewith of one end of the brake-ring, and a sprocket-wheel on said sleeve having a limited rotary movement thereon, means for rotating said sprocket, a stationary case or drum inclosing said sleeve, a split ring interposed between said sleeve and case having an engagement by one end with said sleeve and sprocket and having its free end engaging the inclined part of said sleeve, whereby when said ring is expanded for brake action against said case, its said free end is moved on said inclined part into frictional contact with said case in advance of the contact therewith of the other parts of the ring, and whereby the contact of all of said ring with said case is effected, substantially as set forth.

2. In a bicycle-brake, the combination with the wheel-hub, of a fixed lug or projection carried by said hub, the plane of the rear edge forming an acute, and that of the forward edge an obtuse, angle with the circumferential surface of the hub; a split brake-ring mounted on said hub and having its ends butting against opposite sides of said lug or projection, the edges of said ends being beveled complementary to the beveled edges of said lug; a wheel-driving element loosely mounted on the hub and connected with one end of said brake-ring; and a fixed brake member with which said brake-ring is brought into engagement by means of said connection, so that in forward propulsion the forward end of the split brake-ring will butt against the lug and advance the wheel and by means of said complementary beveled edges be forced inward, out of connection with the fixed brake member and into firm engagement with the lug, and upon back-pedaling the free end will advance upon the inclined forward edge of the lug and thus the whole of the circumferential surface of said brake-ring will be brought into frictional contact with the said fixed brake member, substantially as described.

3. In a bicycle-brake, the combination with the hub and a fixed brake member, of a sleeve carrying a lug screwed to said hub and arranged to rotate therewith, said lug having its forward and rear edges beveled, the plane of the rear edge forming an acute, and that of the forward edge an obtuse, angle with the circumferential surface of the sleeve, a split brake-ring mounted upon and supported by said sleeve and butting against opposite sides of said lug, said ends being beveled complementary to the beveled edges of said lug, said ring having a lateral projection for engagement with an aperture in the web of the wheel-driving element, the edges of said aperture and of the projection being beveled complementary to each other and in an opposite direction to the beveled edges of the lug, so that by forward pressure upon the wheel-driving element the rear edge of the aperture in its web will advance upon the corresponding edge of the projection upon the end of the brake-ring, and by a backward pressure upon the wheel-driving element the forward edge of the aperture in the web will advance under the corresponding edge of the projection upon the lug, and the free end of the brake-ring will be forced to advance upon the corresponding edge of the lug to cause the entire circumferential surface of the brake-ring to come into frictional contact with the braking-surface of the fixed brake member, substantially as described.

In testimony whereof I have signed this specification in the presence of two subscribing witnesses.

ALBERT FENIMORE ROCKWELL.

Witnesses:
THOMAS A. TRACY,
LAURA PENFIELD.